Oct. 16, 1928.
F. NEALE
1,687,780
POROUS METAL PLUG FOR VALVE LUBRICATION
Filed May 1, 1926
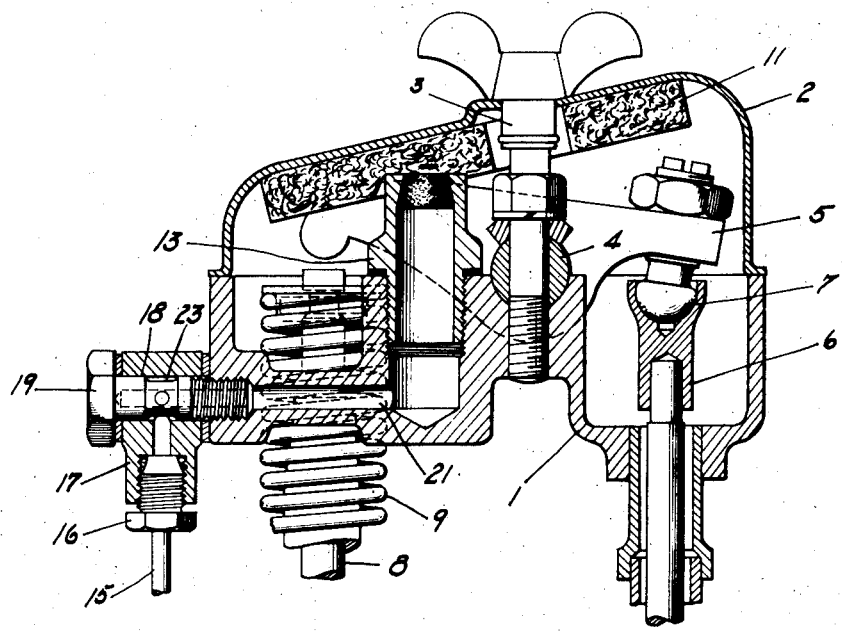
*Fig. 1*
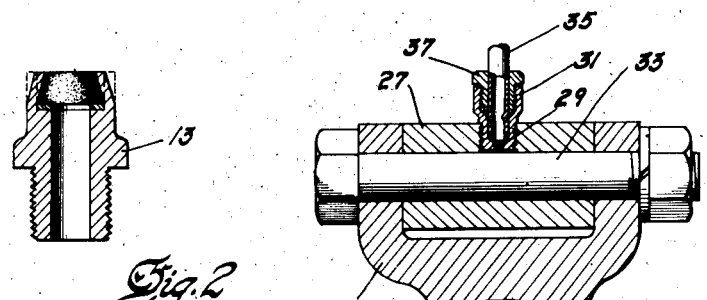
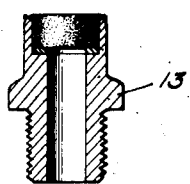
*Fig. 2*
*Fig. 4*
*Fig. 3*
Inventor
Fred Neale
By Blackmore, Spencer & Hiatt
Attorney Patented Oct. 16, 1928.

1,687,780

UNITED STATES PATENT OFFICE.

FRED NEALE, OF DETROIT, MICHIGAN, ASSIGNOR TO GENERAL MOTORS CORPORATION, OF DETROIT, MICHIGAN, A CORPORATION OF MICHIGAN.

POROUS-METAL PLUG FOR VALVE LUBRICATION.

Application filed May 1, 1926. Serial No. 106,017.

This invention relates to lubrication. More particularly it is concerned with the provision of a metering device for use in connection with lubrication systems. Its field of usefulness is not so restricted but it has been designed particularly for use on vehicles.

An object of the invention is to provide a flow retarding means in the lubricating system. The retarding means takes the form of a porous substance, preferably of metal. More specifically the invention aims to meter the supply of oil to a lubricating pad supplying the push rods and valve stems.

In the drawing:

Figure 1 is a vertical sectional view showing a specific embodiment of the inventive idea as applied to the lubrication of vehicle valve stems.

Figures 2 and 3 are vertical sections of modified forms of the plug carrying member.

Figure 4 shows in section another use of the metering plug.

Referring by reference characters to the drawing, 1 represents the head of a motor. 2 is a casing member secured upon the motor head by bolts 3. Upon a horizontal pivot 4 are mounted a series of rocker arms 5, one only of which is shown in the drawing. Push rods 6 actuate the rocker arms by means of ball joints 7, and valve stems 8 are moved by the opposite ends of the rocker arms against the resistance of coil springs 9 in the well known way. Secured to the under face of the casing 2 is a felt pad 11. This pad is engaged by the ends of the rocker arm which in this way take oil from the pad to furnish lubrication for the valve stems and the push rods.

To supply the pad lubricant at a rate commensurate with its needs the following arrangements are made. Into a vertical opening in the head is secured a threaded sleeve member 13. Its upper end is tapered, as shown in Figure 1, and forced up through the bottom of the sleeve into the tapered end of the sleeve is a plug of porous metal, grapho-bronze or similar material being used. This plug engages the pad 11 to deliver to the said pad a metered supply from a source to be described. In the form shown, the lubricant is supplied by a pipe 15 carrying fluid lubricant preferably from a pump. At the end of the pipe is a threaded nut 16 through which the pipe extends. The nut is in threaded engagement with the fitting 17, which has a passage therein affording communication from the end of the pipe 15 to a central eye 18. Through this eye passes a threaded bolt 19. The bolt is axially apertured to afford communication with a horizontal opening 21 in the head, which opening communicates with the vertical opening before mentioned. The axial aperture of bolt 19 communicates by means of a radial passage with a circumferential groove 23 situated within the eye of the fitting. It will therefore be seen that the fluid lubricant passes, under the pressure from the pump, through the pipe 15 and the passages in the head to the porous metal plug and that the resistance of this plug affords a metered supply to the pad.

In Figure 2 is shown a type of sleeve differing slightly. Here the plug is inserted into the open upper end above a shoulder in the sleeve. After the insertion the metal of the sleeve is rolled inwardly to hold the plug in position. Figure 3 shows another slightly different means of securing the plug. In this figure the plug is inserted in much the same way as in Figure 2. However, the thin end of the sleeve is spun over after the insertion of the plug to hold the plug in place. It will be understood that either of these methods of assembling may be adopted in connection with the sleeve 13.

Figure 4 shows, in a general way, the broad field of usefulness of the invention. In this figure is shown a joint between two parts 25 and 27. As applied to vehicles the two parts might be a hanger and a spring eye or perhaps an axle fork and an axle stub. In this figure the fork member 25 is pivoted to the eye member 27 by a pivot bolt 33. The sleeve member 31 and metering plug 29 are supplied by the pipe 35 carried by a threaded nut 37 engaging the sleeve. The supply of lubricant under pressure passes through pipe 35 and keeps the joint adequately lubricated but because of the metering function of the plug no excessive lubricant is supplied to the joint. It will be understood that the degree of porosity may be varied to secure variation in the metering capabilities of the plug. Where the plug is to supply generously the plug may be comparatively porous and where but little lubricant is needed the plug may be made with relatively slight porosity. Among the other advantages of a plug of this material is its hardness. As a result of its hardness it may be driven into conduits or fittings without destroying its porosity. Furthermore, plugs of this kind in addition to being very efficient are comparatively inexpensive.

It will be understood that the field of usefulness of this porous plug, in connection with lubricating systems, is very extensive and that our illustration of its use in vehicles will be suggestive of numerous other uses.

I claim:

1. A fluid conduit, a terminal porous metal plug therein, having a degree of porosity commensurate with the desired discharge of fluid.

2. Means for metering the supply of fluid from a pressure line consisting of a tubular member attachable to the pipe line, the tubular member having a porous metal plug, the degree of porosity being commensurate with the desired delivery of fluid.

3. Metering means for fluids consisting of a plug of grapho-bronze.

In testimony whereof I affix my signature.

FRED NEALE.